United States Patent
Fujishiro

(10) Patent No.: US 9,473,970 B2
(45) Date of Patent: Oct. 18, 2016

(54) COMMUNICATION CONTROL METHOD, BASE STATION, AND USER TERMINAL

(71) Applicant: KYOCERA CORPORATION, Kyoto (JP)

(72) Inventor: Masato Fujishiro, Yokohama (JP)

(73) Assignee: KYOCERA Corporation, Kyoto (JP)

(*) Notice: Subject to any disclaimer, the term of this patent is extended or adjusted under 35 U.S.C. 154(b) by 60 days.

(21) Appl. No.: 14/355,315

(22) PCT Filed: Nov. 2, 2012

(86) PCT No.: PCT/JP2012/078521
§ 371 (c)(1),
(2) Date: Apr. 30, 2014

(87) PCT Pub. No.: WO2013/065840
PCT Pub. Date: May 10, 2013

(65) Prior Publication Data
US 2014/0293822 A1   Oct. 2, 2014

Related U.S. Application Data

(60) Provisional application No. 61/555,271, filed on Nov. 3, 2011.

(51) Int. Cl.
H04W 24/10 (2009.01)
H04W 36/30 (2009.01)
H04W 92/20 (2009.01)

(52) U.S. Cl.
CPC ............ H04W 24/10 (2013.01); H04W 36/30 (2013.01); H04W 92/20 (2013.01)

(58) Field of Classification Search
CPC .................................................. H04W 24/10
See application file for complete search history.

(56) References Cited

U.S. PATENT DOCUMENTS

2009/0312047 A1   12/2009   Satou et al.

2012/0142334 A1   6/2012   Sato et al.
(Continued)

FOREIGN PATENT DOCUMENTS

JP   2009-302959 A   12/2009
JP   2011-101178 A   5/2011
(Continued)

OTHER PUBLICATIONS

An Office Action; "Notice of Reasons for Rejection," issued by the Japanese Patent Office on Apr. 14, 2015, which corresponds to Japanese Patent Application No. 2013-541869 and is related to U.S. Appl. No. 14/355,315; with English language statement of relevance.
(Continued)

Primary Examiner — Dang Ton
Assistant Examiner — Kevin Lee
(74) Attorney, Agent, or Firm — Studebaker & Brackett PC

(57) ABSTRACT

A communication control method including a first base station and a second base station having a smaller coverage area than the first base station, comprises: a step A, performed by the second base station, of notifying the first base station of a reference signal transmission power of the second base station; a step B, performed by a user terminal connected to the first base station, of measuring a reference signal received power from the second base station, and then reporting the reference signal received power to the first base station; and a step C, performed by the first base station, of estimating a path loss between the second base station and the user terminal, on the basis of the reference signal transmission power notified from the second base station in the step A and the reference signal received power reported from the user terminal in the step B.

2 Claims, 7 Drawing Sheets

(56) References Cited

U.S. PATENT DOCUMENTS

| | | |
|---|---|---|
| 2012/0295546 A1 | 11/2012 | Fujito |
| 2012/0320820 A1 | 12/2012 | Yuda et al. |
| 2013/0201968 A1 | 8/2013 | Nakamura et al. |
| 2013/0279403 A1 | 10/2013 | Takaoka et al. |

FOREIGN PATENT DOCUMENTS

| | | |
|---|---|---|
| JP | 2011-155501 A | 8/2011 |
| WO | 2011/018906 A1 | 2/2011 |
| WO | 2011/083774 A1 | 7/2011 |
| WO | 2011/114729 A1 | 9/2011 |
| WO | 2011/129450 A1 | 10/2011 |

OTHER PUBLICATIONS

Nokia Siemens Networks et al.; "Additional information to be exchanged for intra-LTE UL MLB purposes"; 3GPP TSG RAN WG3 Meeting #69-bis; R3-102815; Oct. 11-15, 2010; pp. 1-4; Xi'an, China.

3GPP TR 36.922 1.2.1 (Mar. 2010); 3rd Generation Partnership Project; Technical Specification Group Radio Access Networks; Evolved Universal Terrestrial Radio Access (E-UTRA); LTE TDD Home eNodeB RF Requirements (Release 9); R4-101078; pp. 54-56.

International Search Report; PCT/JP2012/078521; Jan. 22, 2013.

3GPP TS 36.300 V10.4.0 (Jun. 2011); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10).

An Office Action; "Notice of Reasons for Rejection," issued by the Japanese Patent Office on Dec. 1, 2015, which corresponds to Japanese Patent Application No. 2013-541869 and is related to U.S. Appl. No. 14/355,315; with English language statement of relevance.

Nokia Siemens Networks et al.; "Overload Indicator handling for LTE"; 3GPP TSG RAN WG1 #50-bis meeting; R1-074349; Oct. 8-12, 2007; pp. 1-6; Shanghai, China.

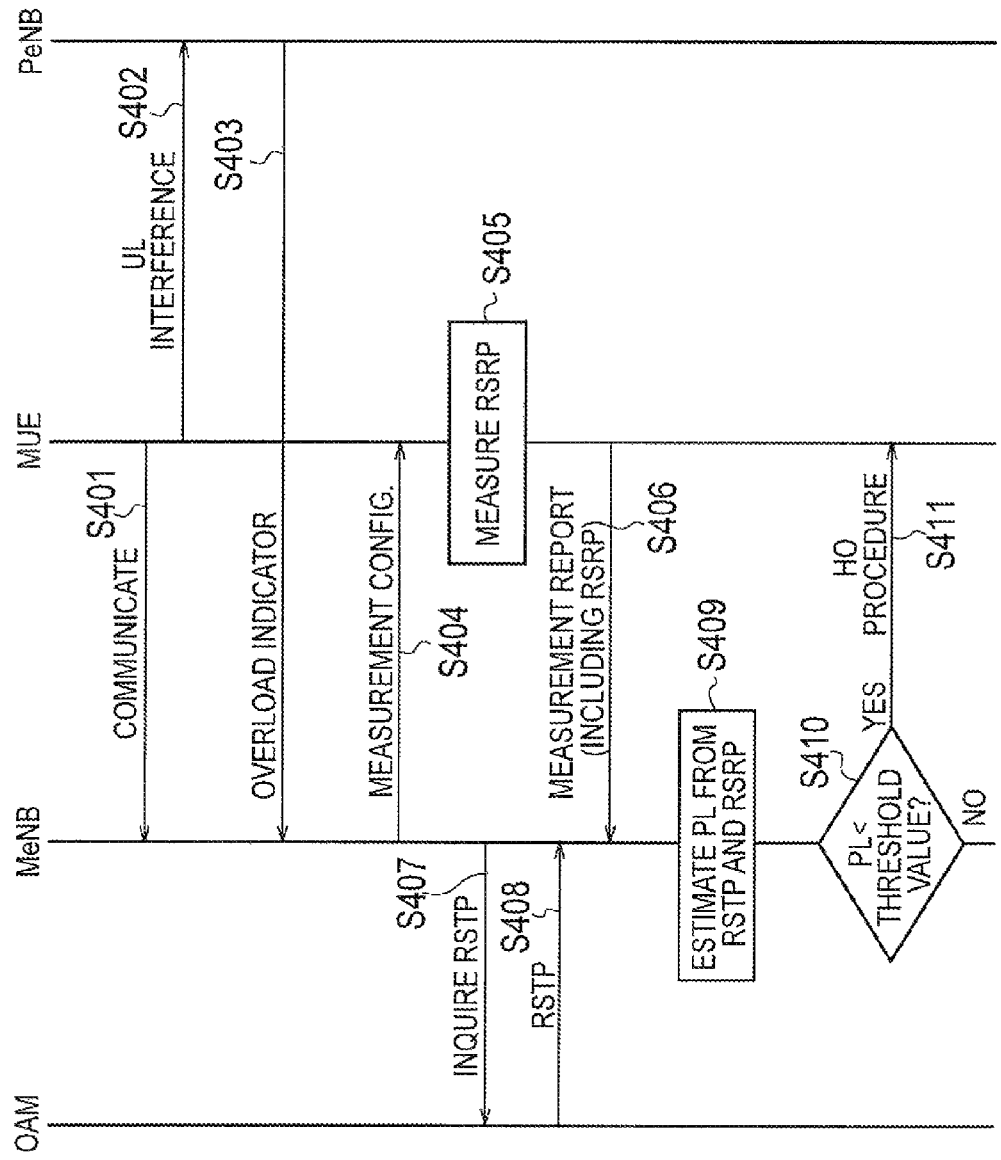

COMMUNICATION CONTROL METHOD, BASE STATION, AND USER TERMINAL

TECHNICAL FIELD

The present invention relates to a communication control method, a base station, and a user terminal in mobile communication systems.

BACKGROUND ART

3GPP (3rd Generation Partnership Project) that is a standardization project of mobile communication systems is working on standardization of LTE Advanced that is an advanced version of LTE (Long Term Evolution) in 3GPP release-10 or later (see, for example, Non-Patent Document 1).

In LTE-Advanced, provision of a heterogeneous network is under study in which a low power base station (so-called pico base station and home base station) is installed in a coverage area of a high power base station (so-called macro base station). The heterogeneous network can distribute the load on the high power base station to the low power base station.

To achieve a wider band width while securing backward compatibility with LTE, a carrier aggregation technique is introduced in LTE Advanced. In the carrier aggregation technique, a carrier (frequency band) in LTE is regarded as a component carrier (CC), and multiple carriers are used in combination for radio communications.

PRIOR ART DOCUMENT

Non-Patent Document

Non-Patent Document 1: 3GPP TS 36.300 V10.4.0

SUMMARY OF THE INVENTION

In the heterogeneous network, when a high power base station and a low power base station use the same carrier and a user terminal connected to the high power base station is located around the boundary of the coverage area of the lower power base station, the low power base station might receive uplink interference from the user terminal.

Here, the following operation has been considered to prevent the uplink interference. Specifically, based on a measurement report from a user terminal connected to a high power base station, the high power base station infers that the user terminal is an interference source if the Reference Signal Received Power (RSRP), measured by the user terminal, from a base station other than the high power base station is at predetermined level or higher. Then, for example, the high power station causes the user terminal as the interference source to perform handover to another carrier or the like. In such an interference source inference method based on the RSRP, the high power base station regards the user terminal, in which the measured RSRP from the other base station is at the predetermined level or higher, as being located close to the other base station, and infers that the user terminal is the interference source.

However, if the other base station is a low power base station, a reference signal transmission power (Reference Signal Tx Power: RSTP) of the other base station is low. Thus, the user terminal might be too close to the other base station at a time when the RSRP at the predetermined level or higher can be measured. Thus, there has been a problem that the interference source estimation method based on the RSRP achieves only low interference source estimation accuracy.

Thus, the present invention provides a communication method, a base station, and a user terminal that are capable of improving uplink interference source inference accuracy.

A communication control method according to the present invention is a communication control method in a mobile communication system including a first base station and a second base station having a smaller coverage area than the first base station. The method comprises: a step A, performed by the second base station, of notifying the first base station of a reference signal transmission power of the second base station; a step B, performed by a user terminal connected to the first base station, of measuring a reference signal received power from the second base station, and then reporting the reference signal received power to the first base station; and a step C, performed by the first base station, of estimating a path loss between the second base station and the user terminal, on the basis of the reference signal transmission power notified from the second base station in the step A and the reference signal received power reported from the user terminal in the step B.

A base station according to the present invention is a base station that transmits a reference signal in a mobile communication system. The base station comprises a first notification unit that notifies a neighboring base station of a reference signal transmission power of the base station.

The base station according to the present invention further comprises a second notification unit that notifies the neighboring base station of a uplink interference level of the base station, wherein the first notification unit notifies the neighboring base station of the reference signal transmission power when the second notification unit notifies the neighboring base station of the uplink interference level.

A communication control method according to the present invention is a communication control method in a mobile communication system including a first base station and a second base station having a smaller coverage area than the first base station. The method comprises: a step A, performed by the second base station, of broadcasting system information including a reference signal transmission power of the second base station; a step B, performed by the first base station, of requesting a user terminal connected to the first base station to report the reference signal transmission power included in the system information; a step C, performed by the user terminal, of measuring a reference signal received power from the second base station, acquiring the reference signal transmission power included in the system information, and then reporting the reference signal received power and the reference signal transmission power to the first base station; and a step D, performed by the first base station, of estimating a path loss between the second base station and the user terminal, on the basis of the reference signal received power and the reference signal transmission power reported from the user terminal in the step C.

A base station according to the present invention is a base station in a mobile communication system. The base station comprises: a request unit that requests a user terminal connected to the base station to report a reference signal transmission power included in system information broadcasted by a different base station; and a reception unit that receives the reference signal transmission power reported from the user terminal and a reference signal received power from the different base station reported from the user terminal.

A user terminal according to the present invention is a user terminal in a mobile communication system. The user terminal comprises: a reception unit that receives from a first base station, a report request for a reference signal transmission power included in system information broadcasted by a second base station; and a report unit that measures a reference signal received power from the second base station, acquire the reference signal transmission power included in the system information, and then report the reference signal received power and the reference signal transmission power to the first base station.

A communication control method according to the present invention is a communication control method in a mobile communication system including a first base station and a second base station having a smaller coverage area than the first base station. The method comprises: a step A, performed by the second base station, of broadcasting system information including a reference signal transmission power of the second base station; a step B, performed by the first base station, of requesting a user terminal connected to the first base station to report a path loss between the second base station and the user terminal; and a step C, performed by the user terminal, of measuring a reference signal received power from the second base station, acquiring the reference signal transmission power included in the system information, and thereafter reporting, to the first base station, the path loss estimated on the basis of the reference signal received power and the reference signal transmission power.

A base station according to the present invention is a base station in a mobile communication system. The base station comprises: a request unit that requests a user terminal connected to the base station to report a path loss between a different base station and the user terminal; and a reception unit that receives from the user terminal, the path loss estimated by the user terminal that measured a reference signal received power from the different base station and acquired a reference signal transmission power included in a system information from the different base station.

A user terminal according to the present invention is a user terminal in a mobile communication system. The user terminal comprises: a reception unit that receives from a first base station, a request to report a path loss between a second base station and the user terminal itself; and a report unit that measures a reference signal received power from the second base station, acquire a reference signal transmission power included in system information from the second base station, and thereafter report, to the first base station, the path loss estimated on the basis of the reference signal received power and the reference signal transmission power.

A communication control method according to the present invention is a communication control method in a mobile communication system including a first base station, a second base station having a smaller coverage area than the first base station, and a management device that manages the first base station and the second base station. The method comprises: a step A, performed by the first base station, of acquiring a reference signal transmission power of the second base station from the management device; a step B, performed by a user terminal connected to the first base station, of measuring a reference signal received power from the second base station, and thereafter reporting the reference signal received power to the first base station; and a step C, performed by the first base station, of estimating a path loss between the second base station and the user terminal on the basis of the reference signal transmission power acquired from the management device in the step A and the reference signal received power reported from the user terminal in the step B.

A base station according to the present invention is a base station in a mobile communication system. The base station comprises: an acquisition unit that acquires a reference signal transmission power of a different base station from a management device; and an estimation unit that estimates a path loss between the different base station and the user terminal on the basis of the reference signal transmission power acquired from the management device and a reference signal received power from the different base station reported from the user terminal.

BRIEF DESCRIPTION OF THE DRAWINGS

FIG. 8 is an operation sequence diagram of the communication system according to the fourth embodiment.

DESCRIPTION OF THE EMBODIMENT

Figure 1:
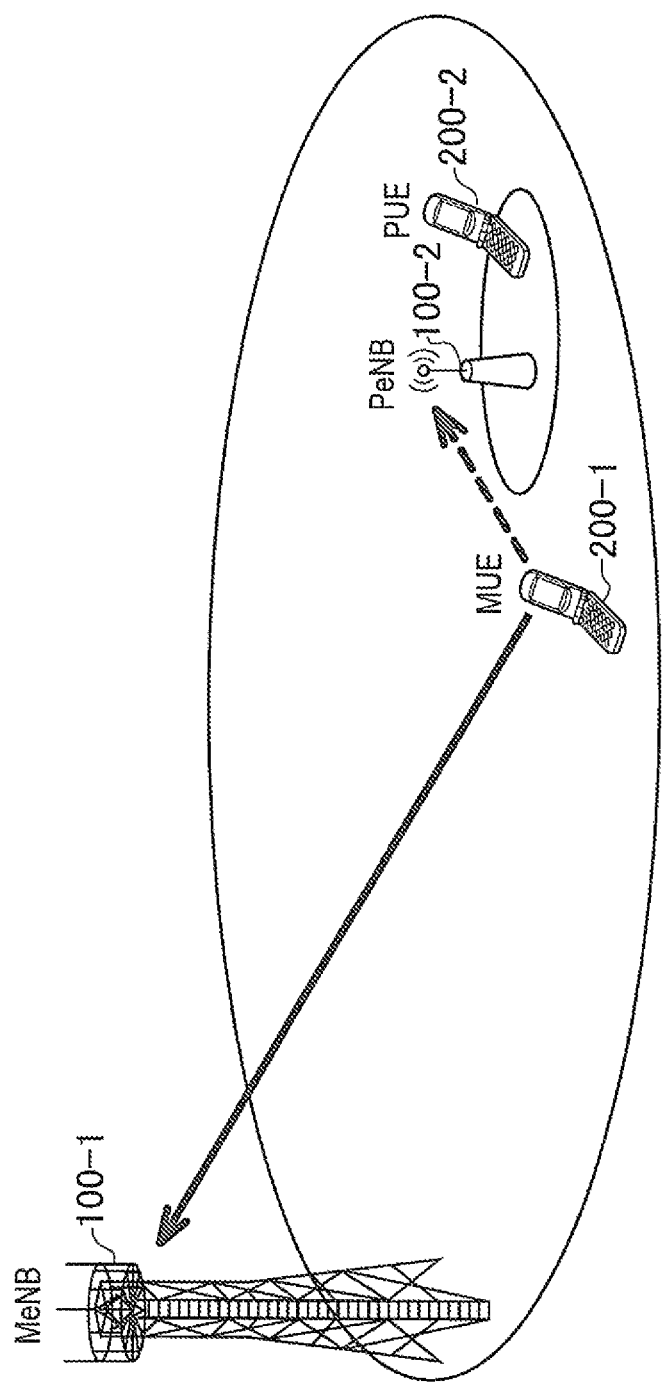
FIG. 1 shows a mobile communication system according to first to third embodiments.

Embodiments of the present invention are described with reference to the drawings. In the drawings related to the embodiments described below, the same or similar portions are denoted with the same or similar reference signs.

First Embodiment

FIG. 1 shows a mobile communication system according to a first embodiment. The mobile communication system according to this embodiment is configured based on LTE Advanced (from 3GPP release-10).

As shown in FIG. 1, the mobile communication system includes a macro base station (Macro evolved Node-B: MeNB) 100-1 configured to form a large coverage area and a pico base station (Pico evolved Node-B: PeNB) 100-2 configured to form a small coverage area. In FIG. 1, only one PeNB 100-2 installed in the coverage area of the MeNB 100-1 is illustrated. Alternatively, multiple PeNBs 100-2 may be installed in the coverage of the MeNB 100-1. A user terminal (User Equipment: UE) is connected to each of the MeNB 100-1 and the PeNB 100-2.

Hereinbelow, the UE connected to the MeNB 100-1 is referred to as an MUE 200-1, and the UE connected to the PeNB 100-1 is referred to as a PUE 200-1. When the MeNB 100-1 and the PeNB 100-2 are not particularly distinguished from each other, they are simply referred to as an eNB 100. When the MUE 200-1 and the PUE 200-2 are not particularly distinguished from each other, they are simply referred to as a UE 200.

Connected is a state where the UE 200 is synchronized with the eNB 100, and is a state where a radio resource can be allocated from the eNB 100 to the UE 200. Uplink is a communication direction from the UE 200 to the eNB 100, and downlink is a communication direction from the eNB 100 to the UE 200.

The MeNB 100-1 and the PeNB 100-2 are included in E-UTRAN (Evolved-UMTS Terrestrial Radio Access Network) as a radio access network of LTE. In the embodiment, E-UTRAN is configured as a heterogeneous network, and the PeNB 100-2 is installed in a coverage area of the MeNB 100-1 and more specifically in a high traffic zone (so-called hot zone) for example.

In the embodiment, the MeNB 100-1 supports two different carriers (CC1 and CC2), and can use a carrier selected from the two carriers for radio communications. Each carrier includes multiple resource blocks (RBs) in a frequency direction. In the embodiment, the PeNB 100-2 supports one carrier (CC1), and uses the one carrier for radio communications. As described above, when the MeNB 100-1 and the PeNB 100-2 use the same carrier (CC1), and the MUE 200-1 using the CC1 is located around the boundary of the coverage area of the PeNB 100-2, the PeNB 100-2 might receive the uplink interference from the MUE 200-1.

The coverage area is formed by one or multiple cells. The cell is identified with a cell ID and is associated with a carrier (uplink carrier and down link carrier in a case of FCC). A carrier, the eNB 100 that uses the carrier, and a coverage area of the eNB 100 may be collectively referred to as a cell. Thus, the MeNB 100-1 may be referred to as a macrocell and the PeNB 100-2 may be referred to as a picocell.

Under a connected (RRC connected) state as a communicating state, the UE 200 can switch a connecting cell (referred to as serving cell). Such a switching of the serving cell is achieved by handover for example. Handover of the UE 200 is controlled by the serving cell of the UE 200.

An X2 interface as a logical communication path for connecting between adjacent base stations is established between the MeNB 100-1 and the PeNB 100-2. An S1 interface as a logical communication path for EPC (Evolved Packet Core) as a core network of LTE is established between EPC and the MeNB 100-1 and between EPC and the PeNB 100-2.

Figure 2:
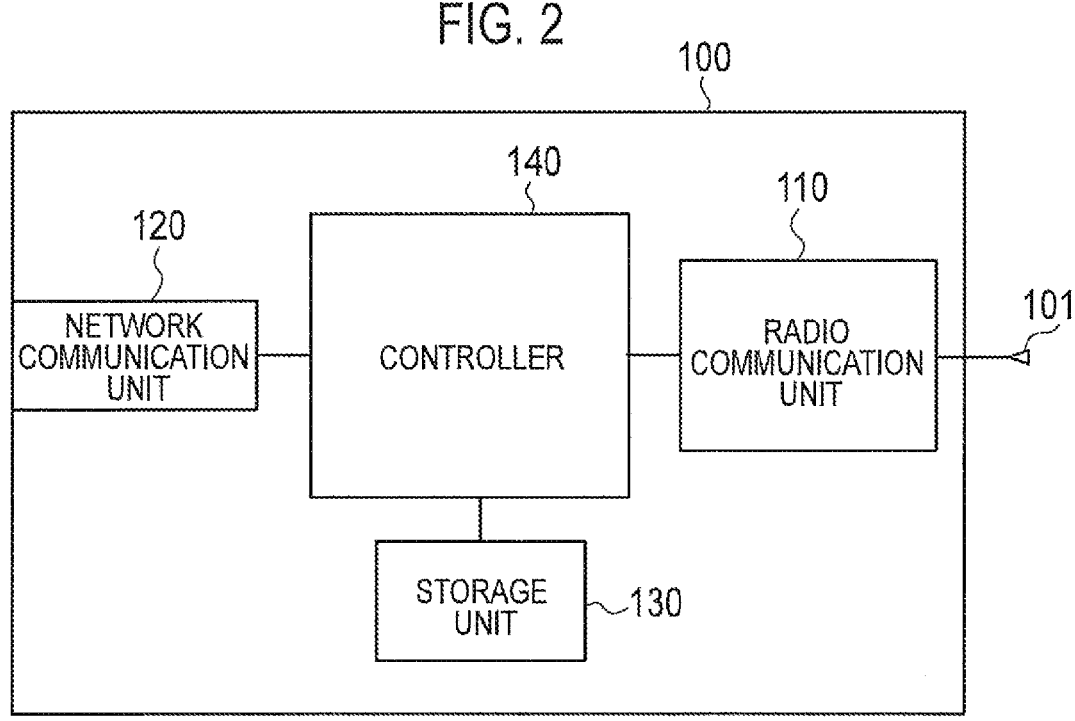
FIG. 2 is a block diagram of an eNB according to the first to the fourth embodiments.

Next, the configuration of the eNB 100 is described. FIG. 2 is a block diagram of the eNB 100. As shown in FIG. 2, the eNB 100 includes multiple antennas 101, a radio communication unit 110, a network communication unit 120, a storage unit 130, and a controller 140.

The antennas 101 are used for transmission and reception of a radio signal. The radio communication unit 110 is configured with a radio frequency (RF) circuit, a base band (BB) circuit, and the like for example, and transmits and receives a radio signal through the antennas 101. In the embodiment, the radio communication unit 110 can perform radio communications by simultaneously using multiple carriers. The radio communication unit 110 transmits a reference signal (Cell specific Reference Signal: CRS) with each cell. The network communication unit 120 performs inter-base station communications with an adjacent eNB on the X2 interface. The network communication unit 120 performs communications with EPC on the S1 interface. The storage unit 130 stores various types of information used for the control of the eNB 100 and the like. The controller 140 controls various functions of the eNB 100.

Figure 3:
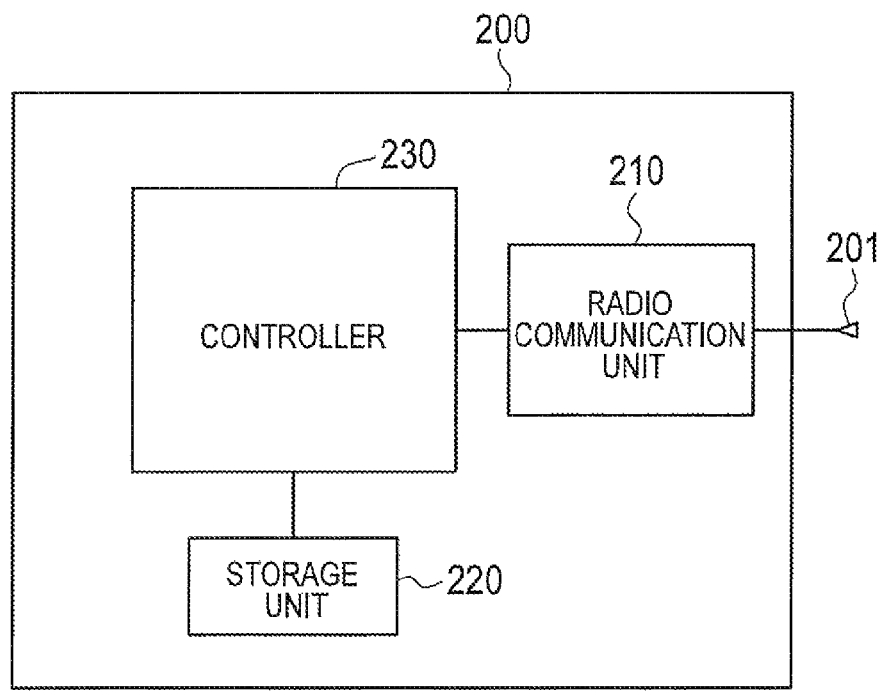
FIG. 3 is a block diagram of a UE according to the first to the fourth embodiments.

Next, the configuration of the UE 200 is described. FIG. 3 is a block diagram of the UE 200. As shown in FIG. 3, the UE 200 includes an antenna 201, a radio communication unit 210, a storage unit 220, and a controller 230.

The antenna 201 is used for the transmission and reception of a radio signal. The radio communication unit 210 is configured with an RF circuit, a BB circuit, and the like for example, and transmits and receives a radio signal through the antenna 201. The storage unit 230 stores various types of information used for the control of the UE 200 and the like. The controller 240 controls various functions of the UE 200.

Figure 4:
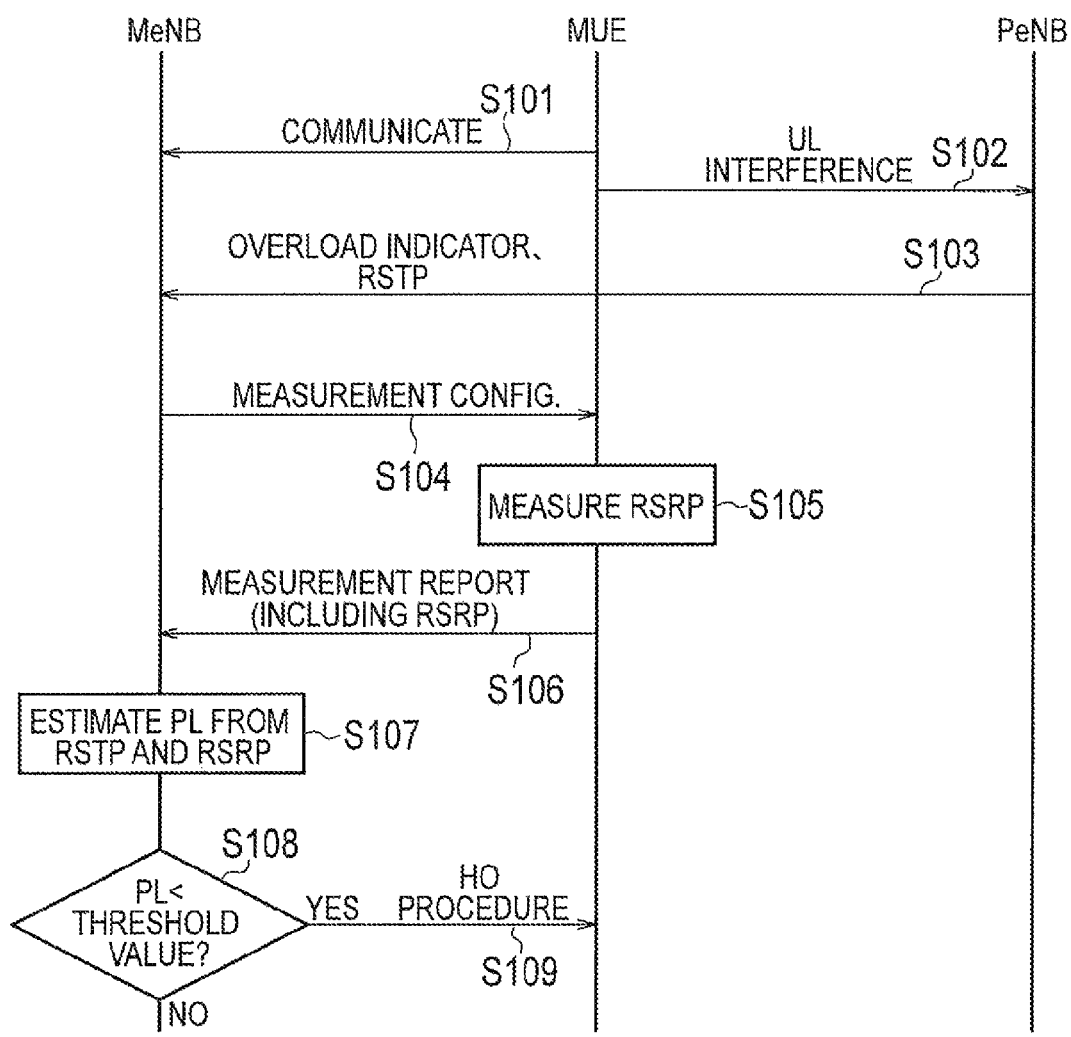
FIG. 4 is an operation sequence diagram of the communication system according to the first embodiment.

Next, an operation of the mobile communication system is described with a communication environment shown in FIG. 1 as an example. FIG. 4 is an operation sequence diagram of a mobile communication system according to the embodiment. In an initial state of this operation sequence, the MeNB 100-1 and the PeNB 100-2 are both using the same carrier C1 in the uplink. Although not elaborated in the figure, the MeNB 100-1 and the PeNB 100-2 each constantly broadcast CRS.

As shown in FIG. 4, in Step S101, the MUE 200-1 performs radio communications with the MeNB 100-1. In Step S102, the PeNB 100-2 is interfered by an uplink signal from the MUE 200-1.

The PeNB 100-2 measures an interference level in each uplink resource block. In Step S103, the PeNB 100-2 transmits Overload Indicator indicating the interference level in each uplink resource block to the MeNB 100-1 on the X2 interface. Thus, the MeNB 100-1 is notified of the uplink interference detected by the PeNB 100-2. When notifying the Overload Indicator, the PeNB 100-2 notifies the MeNB 100-1 of its own transmission power (RSTP) of the CRS. The RSTP may be included in a Load Information message as a message including the Overload Indicator.

The MeNB 100-1 receives the Overload Indicator and the RSTP from the PeNB 100-2. The MeNB 100-1 recognizes that the uplink interference is received by the PeNB 100-2, on the basis of the Overload Indicator from the PeNB 100-2. The MeNB 100-1 stores the RSTP from the PeNB 100-2.

In Step S104, the MeNB 100-1 transmits to the MUE 200-1, measurement configuration information for instructing measurement report transmission.

In Step S105, the MUE 200-1 measures the RSRP of each of the MeNB 100-1 (serving cell) and the PeNB 100-2 (adjacent cell) on the basis of the receivable CRS, in response to the measurement configuration information from the MeNB 100-1.

In Step S106, the MUE 200-1 transmits to the MeNB 100-1, the measurement report including the RSRP of each of the MeNB 100-1 (serving cell) and the PeNB 100-2 (adjacent cell) measured in Step S105.

In Step S107, the MeNB 100-1 estimates path loss (Pass Loss: PL) between the PeNB 100-2 and the MUE 200-1 on the basis of the difference between the RSTP notified from the PeNB 100-2 in Step S103 and the RSTP of the PeNB 100-2 reported in Step S106. For example, a result of correcting a value obtained by subtracting the RSRP from the RSTP may be estimated as the uplink PL.

In Step S108, the MeNB 100-1 compares the PL estimated in Step S107 with a predetermined threshold value. The threshold value is, for example, stored as a value corresponding to a radius of the coverage area of each PeNB 100-2. When the PL estimated in Step S107 is lower than the threshold value, (Step S108; YES), the MUE 200-1 is likely to be in the proximity of the PeNB 100-2 (i.e., around the boundary of the coverage area of the PeNB 100-2). Thus, the MeNB 100-1 determines the MUE 200-1 as the uplink interference source to the PeNB 100-2. In Step S109, the MeNB 100-1 causes the MUE 200-1 to perform handover to another cell (another carrier C2) of the MeNB 100-1. Alternatively, the MUE 200-1 may perform handover to the PeNB 100-2 if possible.

As described above, in the embodiment, the PeNB 100-2 notifies the MeNB 100-1 of its own RSTP. After measuring the RSRP of the PeNB 100-2, the MUE 200-1 reports the RSRP to the MeNB 100-1. The MeNB 100-1 estimates the PL between the PeNB 100-2 and the MUE 200-1 on the basis of the RSTP notified from the PeNB 100-2 and the RSRP reported from the MUE 200-1.

The distance between the PeNB 100-2 and the MUE 200-1 can be obtained from the PL thus obtained. Thus, whether the MUE 200-1 is in the proximity of the PeNB 100-2 can be accurately determined. Accordingly, whether the MUE 200-1 is the uplink interference source to the PeNB 100-2 can be accurately estimated.

In the embodiment, when notifying the MeNB 100-1 (neighboring eNB 100) of its own uplink interference level, the PeNB 100-2 notifies the MeNB 100-1 of its own RSTP. Thus, even when the RSTP of the PeNB 100-2 changes while the PeNB 100-2 is under operation, the MeNB 100-1 can be notified of the current RSTP, and thus, the estimation accuracy of the interference source can be improved.

Second Embodiment

A second embodiment is described below by mainly focusing on the difference from the first embodiment.

Figure 5:
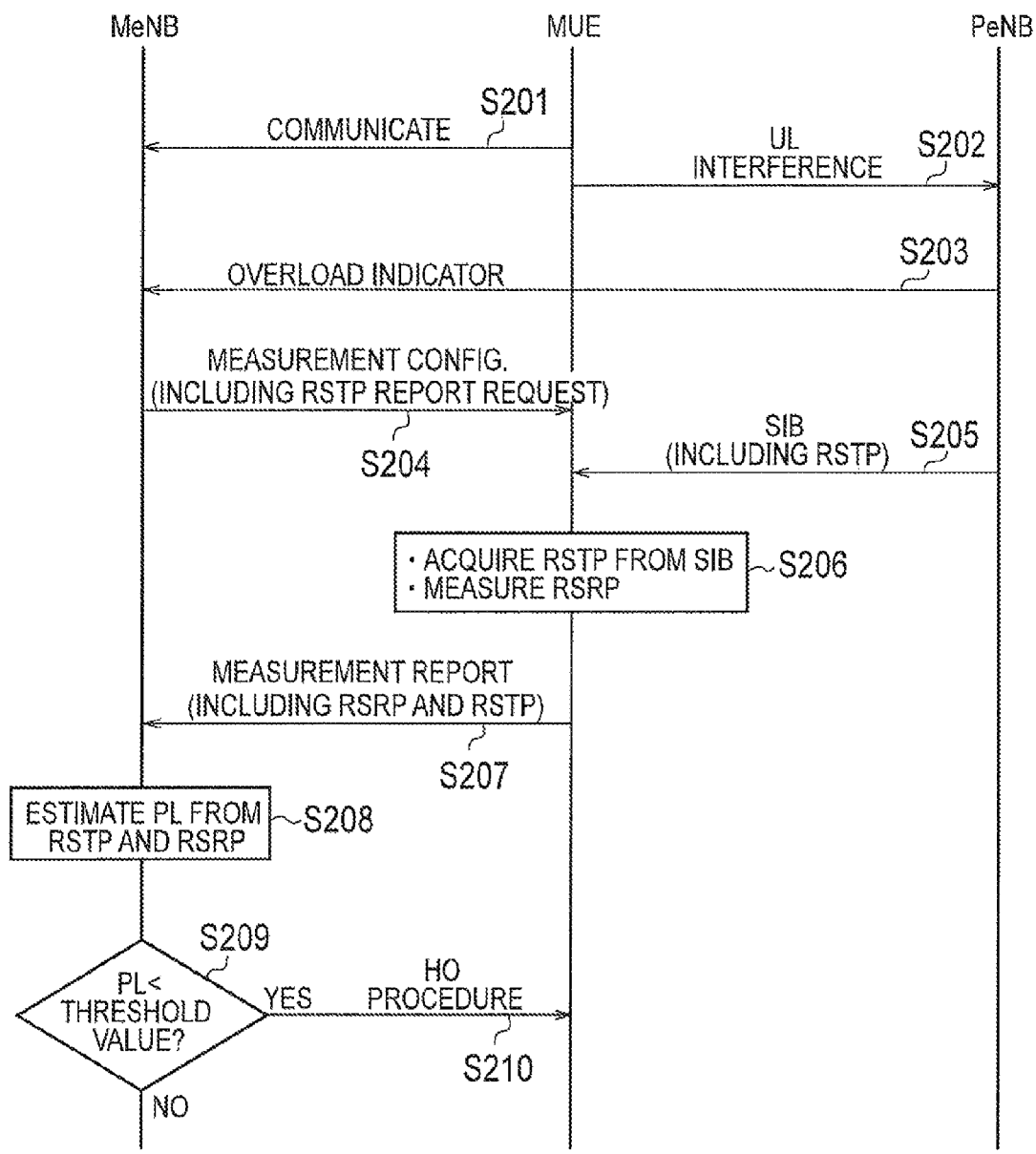
FIG. 5 is an operation sequence diagram of the communication system according to the second embodiment.

FIG. 5 is an operation sequence diagram of a mobile communication system according to the embodiment. In an initial state of this operation sequence, the MeNB 100-1 and the PeNB 100-2 are both using the same carrier C1 in the uplink. Although not elaborated in the figure, the MeNB 100-1 and the PeNB 100-2 each constantly broadcast CRS.

As shown in FIG. 5, Step S201 and Step S202 are the same as those in the first embodiment.

In Step S203, the PeNB 100-2 transmits Overload Indicator indicating the interference level in each uplink resource block to the MeNB 100-1 on the X2 interface. Thus, the MeNB 100-1 is notified of the uplink interference detected by the PeNB 100-2.

The MeNB 100-1 receives the Overload Indicator from the PeNB 100-2. The MeNB 100-1 recognizes that the uplink interference is received by the PeNB 100-2, on the basis of the Overload Indicator from the PeNB 100-2.

In Step S204, the MeNB 100-1 transmits to the MUE 200-1, measurement information configuration information for instructing measurement report transmission. In the embodiment, the MeNB 100-1 requests the MUE 200-1 to report the RSTP included in a system information block type 2 (SIB2). Specifically, report request requesting the reference Signal Power (RSTP) of PDSCH-ConfigCommon in RadioResourceConfigCommon in SIB2 is included in the measurement configuration information. It is to be noted that, in a normal measurement, the MUE 200-1 does not decode the SIB of a cell other than the serving cell.

In Step S205, the PeNB 100-2 broadcasts the SIB2 including the ReferencePower (RSTP). The MUE 200-1 receives the SIB2 from the PeNB 100-2 in response to the RSTP report request received from the MeNB 100-1 in Step S204.

In Step S206, the MUE 200-1 decodes the SIB2 received in Step S205, and acquires the RSTP included in the SIB2. In response to the measurement configuration information received from the MeNB 100-1 in Step S204, the MUE 200-1 measures the RSRP of each of the MeNB 100-1 (serving cell) and the PeNB 100-2 (adjacent cell) on the basis of the receivable CRS.

In Step S207, the MUE 200-1 transmits to the MeNB 100-1, the measurement report including the RSRP of each of the MeNB 100-1 (serving cell) and the PeNB 100-2 (adjacent cell) measured in Step S206, and the RSTP of acquired in Step S206. The MUE 200-1 may include the RSTP in a report other than the measurement report.

In Step S208, the MeNB 100-1 estimates the PL between the PeNB 100-2 and the MUE 200-1 on the basis of the difference between the RSRP of the PeNB 100-2 reported from the MUE 200-1 in Step S207 and the RSTP reported from the MUE 200-1 in Step S207. For example, a result of correcting a value obtained by subtracting the RSRP from the RSTP may be estimated as the uplink PL.

In Step S209, the MeNB 100-1 compares the PL estimated in Step S208 with a predetermined threshold value. The threshold value is, for example, stored as a value corresponding to a radius of the coverage area of each PeNB 100-2. When the PL estimated in Step S208 is lower than the threshold value, (Step S209; YES), the MUE 200-1 is likely to be in the proximity of the PeNB 100-2 (i.e., around the boundary of the coverage area of the PeNB 100-2). Thus, the MeNB 100-1 determines the MUE 200-1 as the uplink interference source to the PeNB 100-2. In Step S210, the MeNB 100-1 causes the MUE 200-1 to perform handover to another cell (another carrier C2) of the MeNB 100-1. Alternatively, the MUE 200-1 may perform handover to the PeNB 100-2 if possible.

As described above, in the embodiment, the PeNB 100-2 broadcasts the SIB2 including its own RSTP. The MeNB 100-1 requests the MUE 200-1 to report the RSTP including the SIB2. The MUE 200-1 measures the RSRP from the PeNB 100-2, acquires the RSTP included in the SIB2, and then reports the RSRP and the RSTP to the MeNB 100-1. The MeNB 100-1 estimates the PL between the PeNB 100-2 and the MUE 200-1 on the basis of the RSRP and the RSTP reported from the MUE 200-1.

The distance between the PeNB 100-2 and the MUE 200-1 can be obtained from the PL thus obtained. Thus, whether the MUE 200-1 is in the proximity of the PeNB 100-2 can be accurately determined. Accordingly, whether the MUE 200-1 is the uplink interference source to the PeNB 100-2 can be accurately estimated.

Third Embodiment

A third embodiment is described below by mainly focusing on the difference from the embodiments described above.

Figure 6:
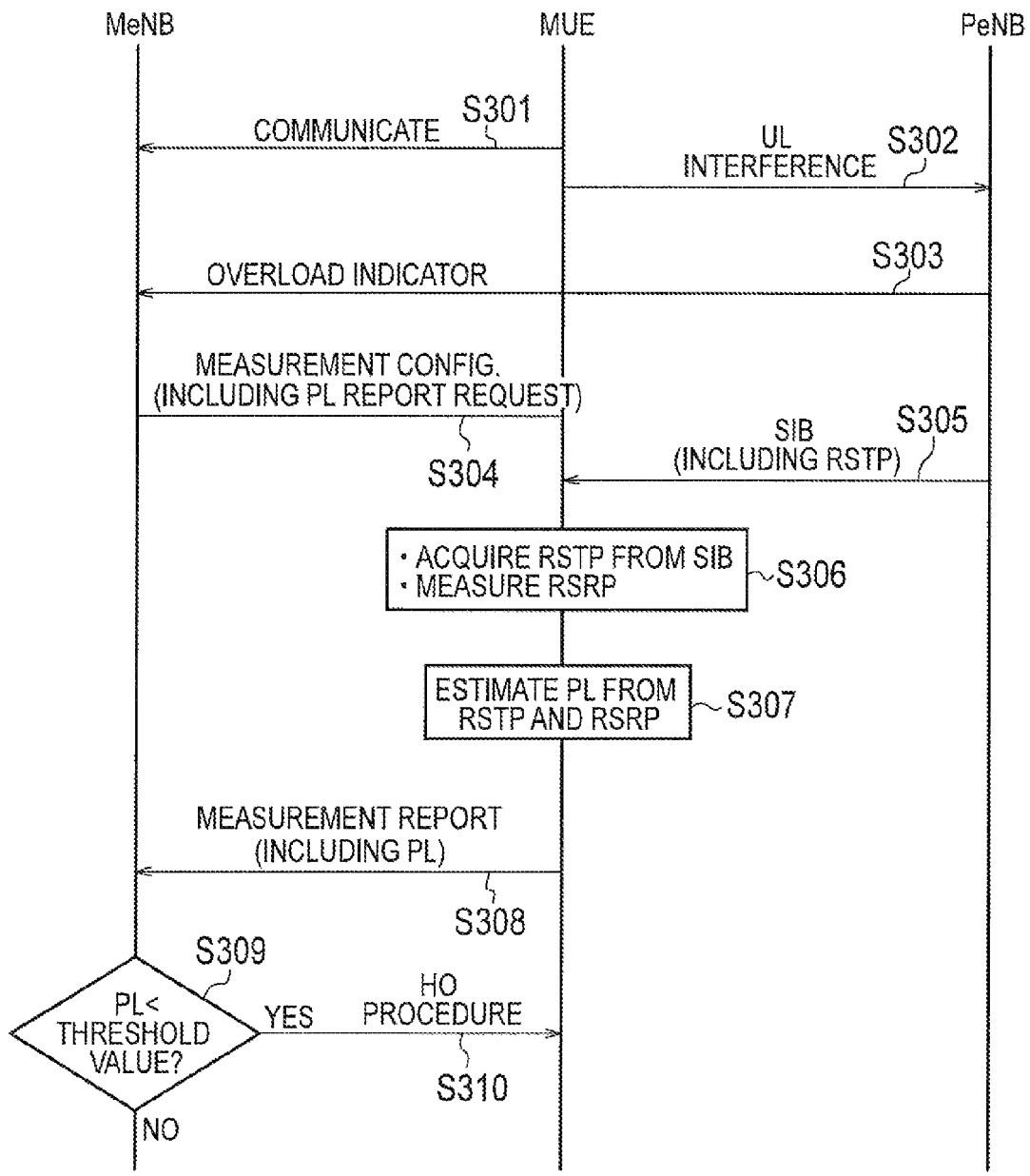
FIG. 6 is an operation sequence diagram of the communication system according to the third embodiment.

FIG. 6 is an operation sequence diagram of a mobile communication system according to the embodiment. In an initial state of this operation sequence, the MeNB 100-1 and the PeNB 100-2 are both using the same carrier C1 in the uplink. Although not elaborated in the figure, the MeNB 100-1 and the PeNB 100-2 each constantly broadcast CRS.

As shown in FIG. 6, Step S301 and Step S302 are the same as those in the first embodiment.

In Step S303, the PeNB 100-2 transmits Overload Indicator indicating the interference level in each uplink resource block to the MeNB 100-1 on the X2 interface. Thus, the MeNB 100-1 is notified of the uplink interference detected by the PeNB 100-2.

The MeNB 100-1 receives the Overload Indicator from the PeNB 100-2. The MeNB 100-1 recognizes that the uplink interference is received by the PeNB 100-2, on the basis of the Overload Indicator from the PeNB 100-2.

In Step S304, the MeNB 100-1 transmits to the MUE 200-1, measurement information configuration information for instructing measurement report transmission. In the embodiment, the MeNB 100-1 requests the MUE 200-1 to report the PL between the Overload Indicator transmission source cell (PeNB 100-2) and the MUE 200-1. Specifically, the PL report request is included in the measurement configuration information.

In Step S305, the PeNB 100-2 broadcasts the SIB2 including the ReferencePower (RSTP). The MUE 200-1 receives the SIB2 from the PeNB 100-2 in response to the RSTP report request received from the MeNB 100-1 in Step S304.

In Step S306, the MUE 200-1 decodes the SIB2 received in Step S305, and acquires the RSTP included in the SIB2. In response to the measurement configuration information received from the MeNB 100-1 in Step S304, the MUE 200-1 measures the RSRP of each of the MeNB 100-1 (serving cell) and the PeNB 100-2 (adjacent cell) on the basis of the receivable CRS.

In Step S307, the MUE 200-1 estimates the PL between the PeNB 100-2 and the MUE 200-1 on the basis of the difference between the RSTP acquired in Step S306 and the RSRP of the PeNB 100-2 measured in Step S306. For example, a result of correcting a value obtained by subtracting the RSRP from the RSTP may be estimated as the uplink PL.

In Step S308, the MUE 200-1 transmits to the MeNB 100-1, the measurement report including the RSRP of each of the MeNB 100-1 (serving cell) and the PeNB 100-2 (adjacent cell) measured in Step S306, and the PL estimated in Step S307. The MUE 200-1 may include the PL in a report other than the measurement report.

In Step S309, the MeNB 100-1 compares the PL estimated in Step S308 with a predetermined threshold value. The threshold value is, for example, stored as a value corresponding to a radius of the coverage area of each PeNB 100-2. When the PL estimated in Step S208 is lower than the threshold value, (Step S309; YES), the MUE 200-1 is likely to be in the proximity of the PeNB 100-2 (i.e., around the boundary of the coverage area of the PeNB 100-2). Thus, the MeNB 100-1 determines the MUE 200-1 as the uplink interference source to the PeNB 100-2. In Step S310, the MeNB 100-1 causes the MUE 200-1 to perform handover to another cell (another carrier C2) of the MeNB 100-1. Alternatively, the MUE 200-1 may perform handover to the PeNB 100-2 if possible.

As described above, in the embodiment, the PeNB 100-2 broadcasts the SIB2 including its own RSTP. The MeNB 100-1 requests the MUE 200-1 connected to the own station to report the PL between the PeNB 100-2 and the MUE 200-1. The MUE 200-1 measures the RSRP from the PeNB 100-2, acquires the RSTP included in the SIB2, and then reports the RSRP and the RSTP to the MeNB 100-1.

The distance between the PeNB 100-2 and the MUE 200-1 can be obtained from the PL thus obtained. Thus, whether the MUE 200-1 is in the proximity of the PeNB 100-2 can be accurately determined. Accordingly, whether the MUE 200-1 is the uplink interference source to the PeNB 100-2 can be accurately estimated.

Fourth Embodiment

Figure 7:
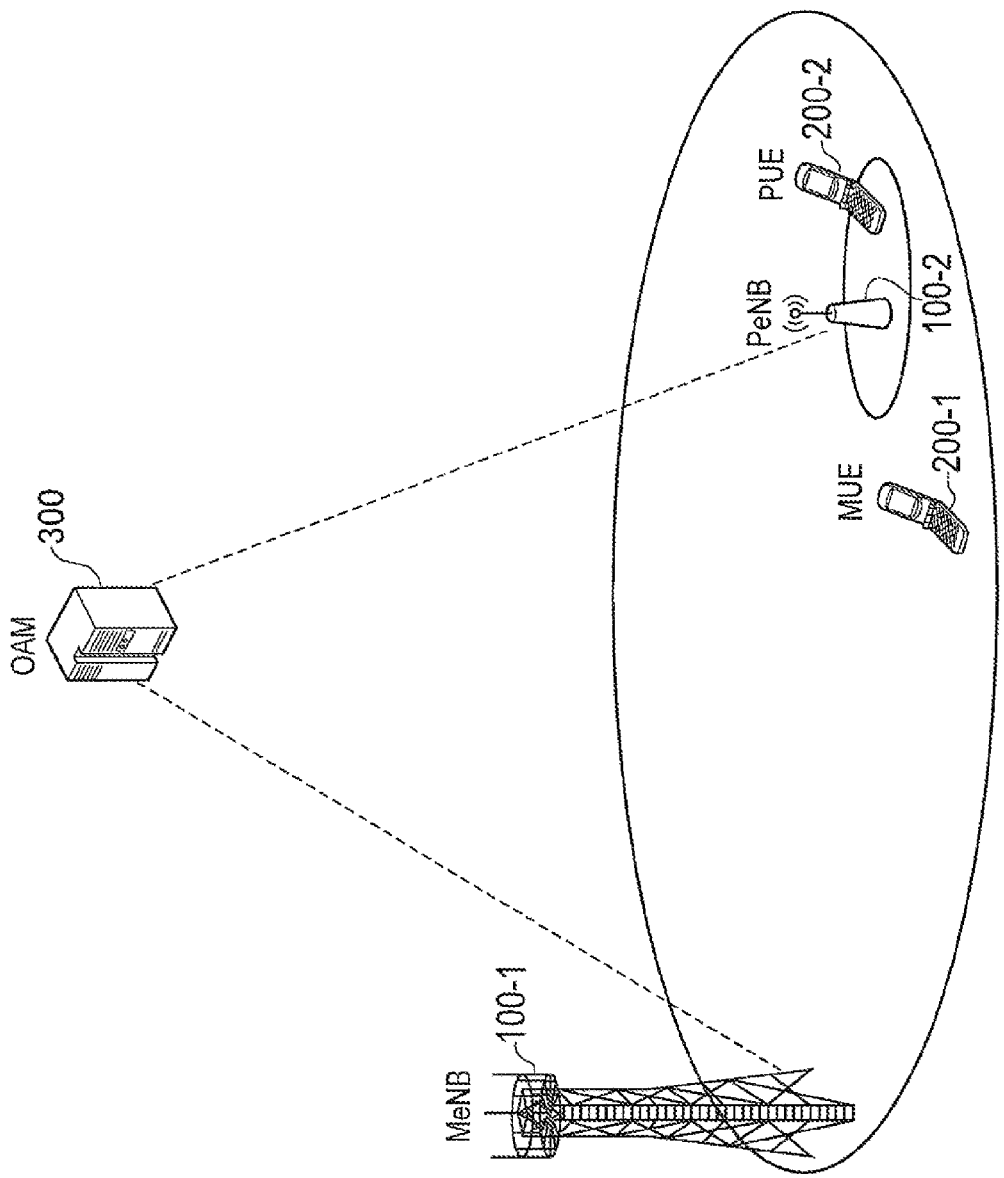
FIG. 7 shows a mobile communication system according to a fourth embodiment.

A fourth embodiment is described below by mainly focusing on the difference from the embodiments described above. In the embodiment, as shown in FIG. 7, a maintenance and monitoring device (Operation and Maintenance: OAM) 300 that manages each of the MeNB 100-1 and the PeNB 100-2 knows the RSTP of each of the MeNB 100-1 and the PeNB 100-2. The OAM 300 notifies the RSTP of a designated eNB 100 (cell) in response to an inquiry from the eNB 100 managed by the OAM 300.

FIG. 8 is an operation sequence diagram of a mobile communication system according to the embodiment. In an initial state of this operation sequence, the MeNB 100-1 and the PeNB 100-2 are both using the same carrier C1 in the uplink. Although not elaborated in the figure, the MeNB 100-1 and the PeNB 100-2 each constantly broadcast CRS.

As shown in FIG. 8, Step S401 and Step S402 are the same as those in the first embodiment.

In Step S403, the PeNB 100-2 transmits Overload Indicator indicating the interference level in each uplink resource block to the MeNB 100-1 on the X2 interface. Thus, the MeNB 100-1 is notified of the uplink interference detected by the PeNB 100-2.

The MeNB 100-1 receives the Overload Indicator from the PeNB 100-2. The MeNB 100-1 recognizes that the uplink interference is received by the PeNB 100-2, on the basis of the Overload Indicator from the PeNB 100-2.

In Step S404, the MeNB 100-1 transmits to the MUE 200-1, measurement information configuration information for instructing measurement report transmission.

In Step S405, in response to the measurement configuration information from the MeNB 100-1, the MUE 200-1 measures the RSRP of each of the MeNB 100-1 (serving cell) and the PeNB 100-2 (adjacent cell) on the basis of the receivable CRS.

In Step S406, the MUE 200-1 transmits to the MeNB 100-1, the measurement report including the RSRP of each of the MeNB 100-1 (serving cell) and the PeNB 100-2 (adjacent cell) measured in Step S406.

In Step S407, the MeNB 100-1 inquires the OAM 300 of the RSTP of the Overload Indicator transmission source cell (PeNB 100-2).

In Step S408, in response to the inquiry in Step S407, the OAM 300 notifies the MeNB 100-1 of the RSTP of the PeNB 100-2. Thus, the MeNB 100-1 acquires the RSTP of the PeNB 100-2.

In Step S409, the MeNB 100-1 estimates the PL between the PeNB 100-2 and the MUE 200-1 on the basis of the difference between the RSRP of the PeNB 100-2 reported in Step S406 and the RSTP notified from the OAM 300 in Step S408. For example, a result of correcting a value obtained by subtracting the RSRP from the RSTP may be estimated as the uplink PL.

In Step S410, the MeNB 100-1 compares the PL estimated in Step S409 with a predetermined threshold value. The threshold value is, for example, stored in advance as a value corresponding to a radius of the coverage area of each PeNB 100-2. When the PL estimated in Step S407 is lower than the threshold value, (Step S410; YES), the MUE 200-1 is likely to be in the proximity of the PeNB 100-2 (i.e., around the boundary of the coverage area of the PeNB 100-2). Thus, the MeNB 100-1 determines the MUE 200-1 as the uplink interference source to the PeNB 100-2. In Step S411, the MeNB 100-1 causes the MUE 200-1 to perform handover to another cell (another carrier C2) of the MeNB 100-1. Alternatively, the MUE 200-1 may perform handover to the PeNB 100-2 if possible.

As described above, in the embodiment, the MeNB 100-1 acquires the RSTP of the PeNB 100-2 from the OAM 300. After measuring the RSRP from the PeNB 100-2, the MUE 200-1 reports the RSRP to the MeNB 100-1. The MeNB 100-2 estimates the PL between the PeNB 100-2 and the MUE 200-1 on the basis of the RSTP of acquired from the OAM 300 and the RSRP reported from the MUE 200-1.

The distance between the PeNB 100-2 and the MUE 200-1 can be obtained from the PL thus obtained. Thus, whether the MUE 200-1 is in the proximity of the PeNB 100-2 can be accurately determined. Accordingly, whether the MUE 200-1 is the uplink interference source to the PeNB 100-2 can be accurately estimated.

Other Embodiment

It should not be understood that the description and drawings which constitute part of this disclosure limit the present invention. From this disclosure, various alternative embodiments, examples, and operation techniques will be easily found by those skilled in the art.

For example, the embodiments and modifications described above do not necessarily have to be independently implemented, but may be implemented in combination.

The information transmitted and received on the X2 interface in the embodiments may be transmitted and received on the S1 interface through EPC.

In the embodiments described above, the description is given with the combination of the MeNB and the PeNB as an example. Alternatively, the combination of the MeNB and a femtocell (HeNB) and the combination of the PeNB and the femtocell (HeNB) may be employed.

In addition, the entire content of U.S. Provisional Application No. 61/555,271 (filed on Nov. 3, 2011) is incorporated in the present specification by reference.

INDUSTRIAL APPLICABILITY

As described above, since the present invention can improve uplink interference source inference accuracy, and thus, the present invention is useful in a radio communication field such as a mobile communication.

The invention claimed is:

1. A base station in a mobile communication, comprising:
a transmitter configured to transmit a request to a user terminal connected to the base station, the request requesting the user terminal to acquire a reference signal transmission power (RSTP) included in system information block broadcasted by another base station having a smaller coverage area than the base station and to report the RSTP to the base station,
a receiver configured to receive a report reported by the user terminal, the report indicating a reference signal received power (RSRP) from each of the base station and the another base station measured by the user terminal and indicating the RSTP acquired by the user terminal, and
a controller configured to estimate a path loss between the another base station and the user terminal, on the basis of the RSTP and the RSRP reported from the user terminal.

2. A user terminal connected to a first base station in a mobile communication, comprising:
a receiver configured to receive a request transmitted by the first base station, the request requesting the user terminal to report reference signal transmission power (RSTP) included in a system information block broadcasted by a second base station having a smaller coverage area than the first base station,
a controller configured to measure a reference signal received power (RSRP) from each of the first base station and the second base station and acquire the RSTP included in the system information block broadcasted by the second base station and thereafter report, to the first base station, a measurement report including RSTP and the RSRP,
wherein the first base station is configured to estimate a path loss between the second base station and the user terminal, on the basis of the RSTP and the RSRP reported from the user terminal.

* * * * *